(12) United States Patent  (10) Patent No.: US 8,043,179 B2
Seki et al. (45) Date of Patent: Oct. 25, 2011

(54) DRIVE CHAIN ADJUSTMENT MECHANISM OF CHAIN-DRIVEN VEHICLE

(75) Inventors: Bunzo Seki, Saitama (JP); Tomoaki Yamagata, Saitama (JP); Shigeto Inami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 771 days.

(21) Appl. No.: 11/511,328

(22) Filed: Aug. 29, 2006

(65) Prior Publication Data

US 2007/0066429 A1 Mar. 22, 2007

(30) Foreign Application Priority Data

Aug. 31, 2005 (JP) ................................ 2005-252350

(51) Int. Cl.
*F16H 7/14* (2006.01)
(52) U.S. Cl. .............. 474/112; 74/840; 74/57; 474/116; 180/374; 180/357
(58) Field of Classification Search .................. 474/112, 474/116; 180/337, 357, 366, 374, 350; 74/840, 74/54, 55, 56, 57; *F16H 7/14*
See application file for complete search history.

(56) References Cited

U.S. PATENT DOCUMENTS

| | | | | |
|---|---|---|---|---|
| 1,141,539 A * | 6/1915 | Greer et al. | ................... | 474/112 |
| 4,237,744 A * | 12/1980 | Jolly | .............................. | 474/116 |
| 4,287,960 A * | 9/1981 | McConnell | ...................... | 180/16 |
| 5,533,585 A * | 7/1996 | Kawano et al. | ................ | 180/190 |
| 5,752,892 A * | 5/1998 | Taomo et al. | .................. | 474/116 |
| 5,888,159 A * | 3/1999 | Liao | ............................... | 474/116 |
| 5,895,332 A * | 4/1999 | Olson et al. | .................... | 474/113 |
| 5,902,202 A * | 5/1999 | Guerra | .......................... | 474/114 |
| 6,193,622 B1 * | 2/2001 | Cressman et al. | ............ | 474/109 |
| 6,286,619 B1 * | 9/2001 | Uchiyama et al. | ............ | 180/337 |
| 6,446,748 B1 * | 9/2002 | Suzuki | ........................... | 180/350 |
| 6,533,060 B1 * | 3/2003 | Seto | ............................. | 180/337 |
| 6,789,636 B2 * | 9/2004 | Hurlburt | .................... | 180/24.12 |
| 7,052,422 B2 * | 5/2006 | Skidmore et al. | ............ | 474/116 |
| 7,101,295 B2 * | 9/2006 | Taomo et al. | .................. | 474/117 |
| 7,661,687 B2 * | 2/2010 | Seki et al. | ............. | 280/124.135 |
| 2007/0074925 A1 * | 4/2007 | Seki et al. | ...................... | 180/374 |

FOREIGN PATENT DOCUMENTS

| | | |
|---|---|---|
| JP | 57-37083 A | 3/1982 |
| JP | 63-82893 A | 4/1988 |
| JP | 2-208192 A | 8/1990 |

* cited by examiner

*Primary Examiner* — Bradley King
*Assistant Examiner* — Thomas Irvin
(74) *Attorney, Agent, or Firm* — Birch, Stewart, Kolasch and Brich, LLP

(57) ABSTRACT

A drive chain adjustment mechanism for simplifying the tension adjustment work of a drive chain of an all terrain vehicle. The drive chain is wound around a driven sprocket connected to the rear wheels of the vehicle. The mechanism includes a case to which the driven sprocket is coupled; a cam which moves the case in a fore and aft direction with respect to a vehicle body frame; and a bolt which is located rearward of a shaft portion of the driven sprocket, and which attaches the cam and the case to the vehicle body frame. When the case is moved in the fore and aft direction of a vehicle body, the tension of the drive chain is adjusted.

15 Claims, 4 Drawing Sheets

DRIVE CHAIN ADJUSTMENT MECHANISM OF CHAIN-DRIVEN VEHICLE

CROSS-REFERENCE TO RELATED APPLICATION

The present application claims priority under 35 U.S.C. §119 to Japanese Patent Application No. 2005-252350, filed Aug. 31, 2005, the entire contents of which are hereby incorporated by reference.

BACKGROUND OF THE INVENTION

1. Field of the Invention

The present invention relates to a drive chain adjustment mechanism of a chain-driven vehicle, and particularly, to a drive chain adjustment mechanism of a chain-driven vehicle, which is capable of easily adjusting tension of a drive chain.

2. Description of Background Art

In a chain-driven vehicle in which rear wheels are driven with a drive chain and a driven sprocket around which the drive chain is wound, tension of the drive chain is sometimes changed depending on running conditions and the like. When such a change occurs, it is necessary to adjust the tension of the drive chain by moving the sprocket with respect to a vehicle body. As a technology regarding the drive chain adjustment mechanism of the chain-driven vehicle, which is as described above, there is one in which a housing which supports the driven sprocket and is attached to a vehicle body side by plural bolts is moved with respect to the vehicle body by loosening the plural bolts, and the tension of the drive chain is thus adjusted, and thereafter, the plural bolts are tightened again (for example, refer to Japanese Patent Laid-Open No. S63 (1988)-82893).

However, in the technology described in to Japanese Patent Laid-Open No. S63 (1988)-82893, it is necessary that the plural bolts be loosened to perform the tension adjustment of the drive chain and that the plural bolts be tightened again, resulting in a problem that work of the tension adjustment is extremely burdensome.

SUMMARY AND OBJECTS OF THE INVENTION

The present invention is made in consideration of the above-described circumstances. It is an object of the present invention to provide a drive chain adjustment mechanism of a chain-driven vehicle, with which the tension adjustment work of a drive chain is made easier.

In order to achieve the above-describe object, according to a first aspect of the present invention includes a drive chain adjustment mechanism of a chain-driven vehicle chain-driving two rear wheels, driving the rear wheels with a drive chain and a driven sprocket around which the drive chain is wound, moving the driven sprocket in a fore and aft direction of a vehicle body, and thereby adjusting tension of the drive chain. The drive chain adjustment mechanism includes a case to which the driven sprocket is coupled; a cam which moves the case in the fore and direction with respect to the vehicle body; and a bolt which is located rearward of a shaft portion of the driven sprocket, and which attaches the cam and the case to the vehicle body.

According to a second aspect of the present invention, at least first and second support portions are supported on the vehicle body. The first support portion is coupled to the vehicle body together with the cam with the bolt movable in the fore and aft direction with respect to the vehicle body, and the second support portion has a long hole which allows the case to move in the fore and aft direction with respect to the vehicle body.

According to a third aspect of the present invention, a pair of the cams are provided on both sides of the case in a right and left direction of the vehicle body, and the drive chain is disposed between the pair of cams in the right and left direction of the vehicle body.

According to a fourth aspect of the present invention, the rear wheels are suspended right and left independently of each other through a pair of axle shafts individually held by a pair of outer rings, the driven sprocket is fixed to the outer ring, and the pair of outer rings are rotatably supported by a bearing held in the case.

Note that the case to which the driven sprocket of the present invention is coupled includes a case to which the driven sprocket is coupled to the outer ring with a bearing.

In accordance with the first aspect of the present invention, the case to which the driven sprocket is coupled and the cam which moves the case in the fore and aft direction with respect to the vehicle body are attached to the vehicle body by the bolt located rearward of the shaft portion of the driven sprocket. Accordingly, when the bolt is loosened, the case becomes movable with respect to the vehicle body, and it becomes possible to adjust a position of the case by the cam. Then, the position of the case is adjusted by the cam, the tension of the drive chain is adjusted, and thereafter, the bolt is tightened. The case is thus attached to the vehicle body together with the cam. Hence, it becomes unnecessary to loosen and tighten other bolts which support the case on the vehicle body side, and thereby the tension adjustment work of a drive chain is made easier.

In accordance with the second aspect of the present invention, the case includes at least the first and the second support portions supported on the vehicle body, the first support portion is coupled to the vehicle body together with the cam with the bolt movable in the fore and aft direction with respect to the vehicle body, and the second support portion has the long hole which allows the case to move in the fore and aft direction with respect to the vehicle body. Accordingly, the bolt is moved in the fore and aft direction in response to rotation of the cam in the first support portion, and the case thus moves in the fore and aft direction by the first and the second support portions. Hence, also in the case where the case is supported on the vehicle body at least by the first and the second support portions, it is possible to adjust the drive chain only by work for the first support portion, and thereby the tension adjustment work of a drive chain is made easier and the number of parts can be reduced.

In accordance with the third aspect of the present invention, the pair of cams are provided on both sides of the case in the right and left direction of the vehicle body, and the drive chain is disposed between the pair of cams in the right and left direction of the vehicle body. Accordingly, the tension of the drive chain can be received by the right and left pair of cams with good balance, and other members which support the tension of the drive chain become unnecessary.

In accordance with the third aspect of the present invention, the rear wheels are suspended right and left independently of each other through the pair of axle shafts individually held by the pair of outer rings, the driven sprocket is fixed to the outer ring, and the pair of outer rings are rotatably supported by the bearing held in the case. Accordingly, the drive chain adjustment mechanism can be applied to a chain-driven vehicle with a rear-wheel independent suspension system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
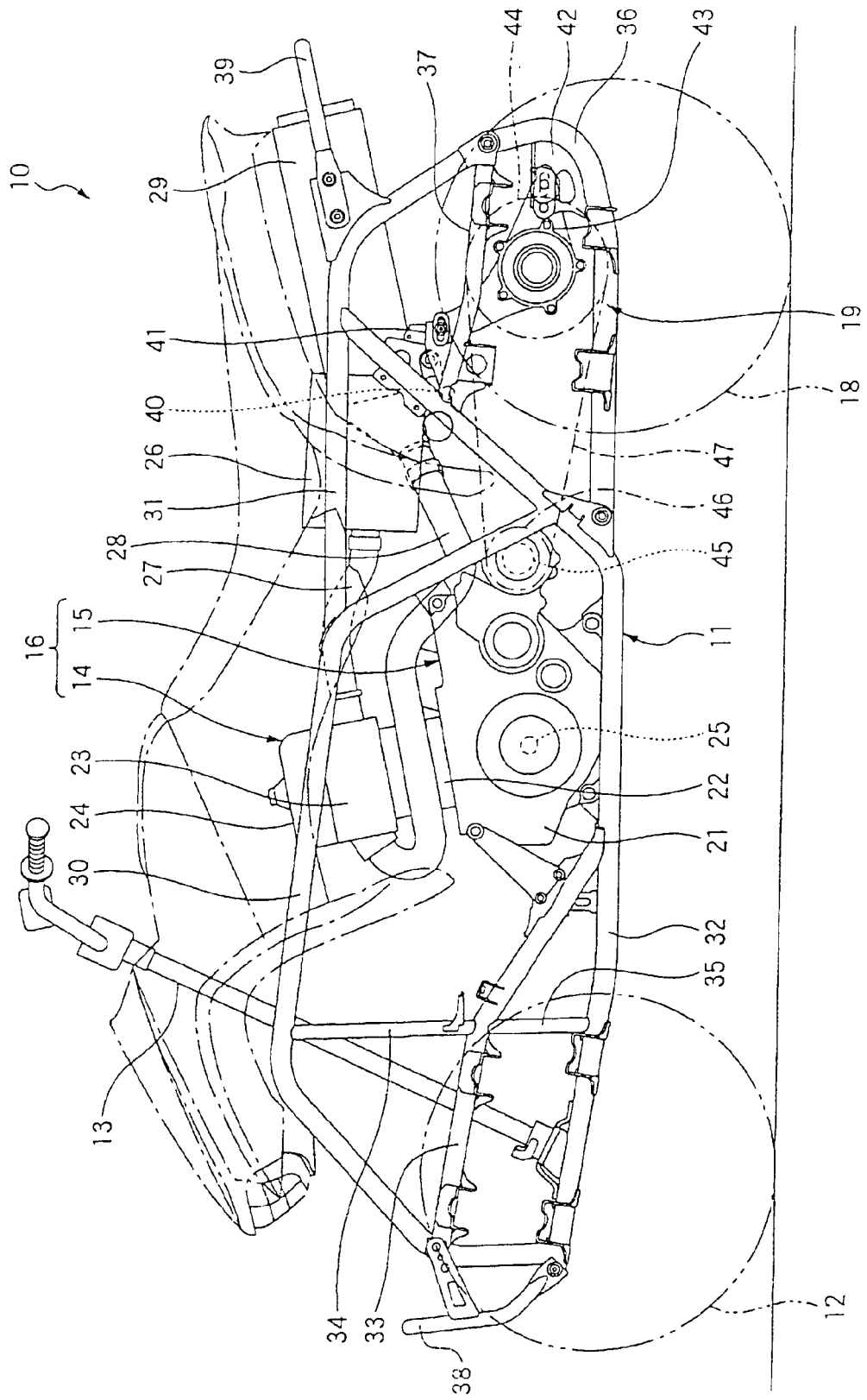
FIG. 1 is a side view showing an all terrain vehicle to which a drive chain adjustment mechanism according to an embodiment of the present invention is applied.

FIG. 1 is a left side view of an all terrain vehicle 10 as a chain-driven vehicle of the present invention. The all terrain vehicle 10 is a saddle riding four-wheeled vehicle (a so-called buggy vehicle). The all terrain vehicle 10 is a vehicle in which a steering shaft 13 for steering the right and the left front wheels 12 is attached to a front portion of a vehicle body frame 11, a power unit 16 composed of an engine 14 and a transmission 15 is attached to a center portion of the vehicle body frame 11, and a drive force transmission unit 19 for transmitting drive force to the right and the left rear wheels 18 is extended rearward from the power unit 16.

FIG. 1 illustrates a crankcase 21, a cylinder block 22, a cylinder head 23, a head cover 24, a crankshaft 25, an air cleaner 26 connected to the cylinder head 23 through a connecting tube 27, an exhaust pipe 28 extended rearward from the cylinder head 23, and a muffler 29 connected to a rear end of the exhaust pipe 28.

The vehicle body frame 11 includes a right and left pair of upper frames 30 which form a large mountain shape from a center portion of a vehicle body toward a front portion thereof. A right and left pair of seat rails 31 extend substantially horizontally toward the rear from top-side rear portions of the respective upper frames 30 and then inclined downward toward the rear. A right and left pair of lower frames 32 extend substantially horizontally toward the rear from front-end lower portions of the respective upper frames 30 and then extended upward toward the rear, in which rear end portions are coupled to the seat rails 31 and rear end portions of the upper frames 30 are coupled to lower portions of slant portions. A right and left pair of front frames 33 extend substantially horizontally toward the rear from front portions of the respective upper frames 30 and then extended downward toward the rear, in which rear end portions are coupled to the lower frames 32. Upper portion coupling frames 34 couple front-side upper portions of the respective upper frames 30 and the respective front frames 33 vertically to each other. In addition, lower portion coupling frames 35 couple the respective front frames 33 and the respective lower frames 32 vertically to each other.

Moreover, the vehicle body frame 11 includes a right and left pair of rear lower frames 36 extended substantially horizontally toward the rear from rear lower portions of the respective lower frames 32, then extended upward, and coupled to rear end portions of the seat rails 31; and rear middle frames 37 which are extended substantially horizontally and couple the rear slant portions of the lower frames 32 and the rear end portions of the seat rails 31 to each other.

Note that a front guard 38 is attached to the front end portions of the right and the left upper frames 30, and moreover, a rear carrier 39 is attached to rear portions of the right and the left seat rails 31.

To front portions of the right and the left rear middle frames 37, a cross pipe 40 extended along a right and left direction is fixed so as to couple the front portions to each other, and a front support bracket 41 is fixed to the cross pipe 40. Meanwhile, to insides of rear lower portions of the right and the left rear lower frames 36, rear support brackets 42 are individually fixed at positions below and rearward of the front support bracket 41. On the front support bracket 41 and the right and the left rear support brackets 42, a case 43 to which a driven sprocket 44 of the drive force transmission unit 19 is attached is supported.

Figure 2:
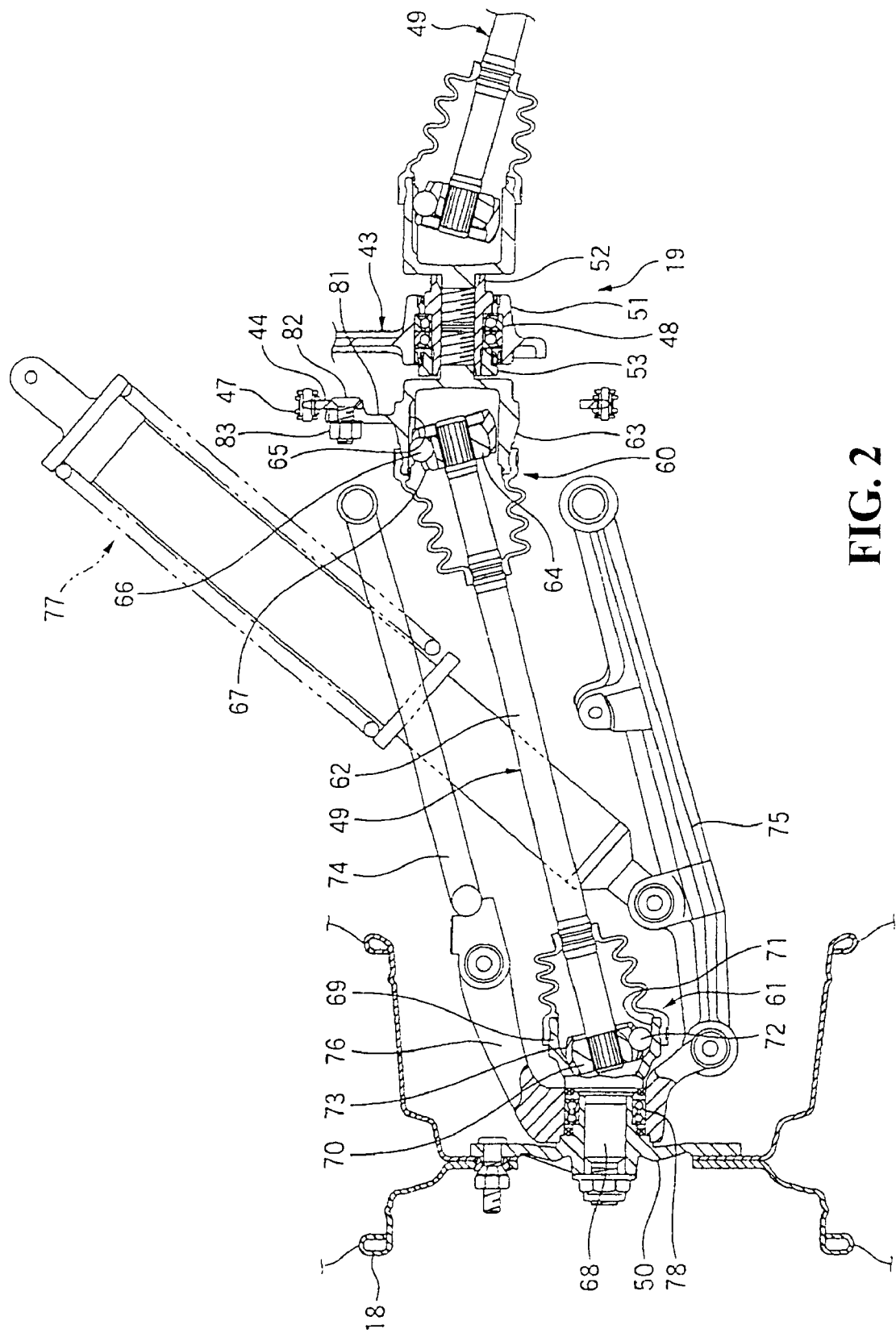
FIG. 2 is a back view of a drive force transmission unit of the all terrain vehicle, taking a part thereof as a cross section.

FIG. 2 is a back view (a partial cross-sectional view) showing a rear portion of the drive force transmission unit 19. As shown in FIG. 1 and FIG. 2, the drive force transmission unit 19 is composed of a drive sprocket 46 attached to an output shaft 45 of the transmission 15 of the power unit 16; the case 43 supported on the vehicle body frame 11; the driven sprocket 44 coupled to the case 43 with a bearing 48 and outer rings 63; a drive chain 47 wound around the drive sprocket 46 and the driven sprocket 44; the bearing 48 supported on the case 43; a right and a left drive shafts (axle shafts) 49 of which one ends are supported on the bearing 48; and a right and a left hubs 50 (FIG. 2 shows only one of them) coupled to tip ends of the right and the left drive shafts 49. The rear wheels 18 are attached to the hubs 50.

The bearing 48 is held by a cylinder portion 51 formed at an intermediate position of the case 43, and the cylinder portion 51 rotatably supports a sleeve 52 fitted into the bearing 48. Moreover, an inner ring of the bearing 48 is positioned in an axial direction by a nut member 53 screwed to the sleeve 52.

Each of the drive shafts 49 is composed of a sliding constant-velocity joint 60 which is coupled to the bearing side, swingable, and expandable/contractible in an axial direction; a non-sliding constant-velocity joint 61 which is coupled to the hub 50 side and swingable; and a shaft 62 provided between the constant-velocity joints 60 and 61.

Each of the constant-velocity joint 60 is composed of the outer ring 63 screwed and fastened to the sleeve 52; an inner ring 64 coupled to one end of the shaft 62 by splines; plural balls 66 provided on an outer circumferential surface of the inner ring 64 and arranged movably in plural ball grooves 65 formed on an inner circumferential surface of the outer ring 63; and a cage 67 which holds the balls 66.

The constant-velocity joint 61 is also composed of an outer ring 69 formed integrally with a shaft 68 fitted into the hub 50; an inner ring 70 coupled to the other end of the shaft 62 by splines; plural balls 72 provided on an outer circumferential surface of the inner ring 70 and arranged movably in plural ball grooves 71 formed on an inner circumferential surface of the outer ring 69; and a cage 73 which holds the balls 72.

Note that FIG. 2 illustrates an upper arm 74 for supporting the rear wheel; a lower arm 75 for supporting the rear wheel;

a knuckle arm 76 for supporting the rear wheel, which is supported on tip ends of the upper arm 74 and the lower arm 75; and a rear cushion unit 77 interposed between the vehicle body frame 11 and the lower arm 75. The knuckle arm 76 rotatably supports the constant-velocity joint 61 with a bearing 78.

Moreover, on the left one of the outer rings 63, a plurality of protruding attachment portions 81 protruding outward in a diameter direction are formed integrally therewith. The driven sprocket 44 is fixed to the protruding attachment portions 81 by bolts 82 and nuts 83.

In such a manner as described above, the right and left pair of outer rings 63 are rotatably supported on the bearing 48 held by the case 43, and the driven sprocket 44 is fixed to one of the outer rings 63. Moreover, the drive shafts 49 for the rear wheels 18 are individually held by the right and left pair of outer rings 63, and thus the two wheels 18 are suspended right and left independently of each other with the pair of drive shafts 49. By the power transmitted to the output shaft 45 of the power unit 16, the all terrain vehicle 10 constituted as described above drives the rear wheels 18 with the drive sprocket 46, the drive chain 47, the driven sprocket 44 around which the drive chain 47 is wound, and the drive shafts 49.

Figure 3:
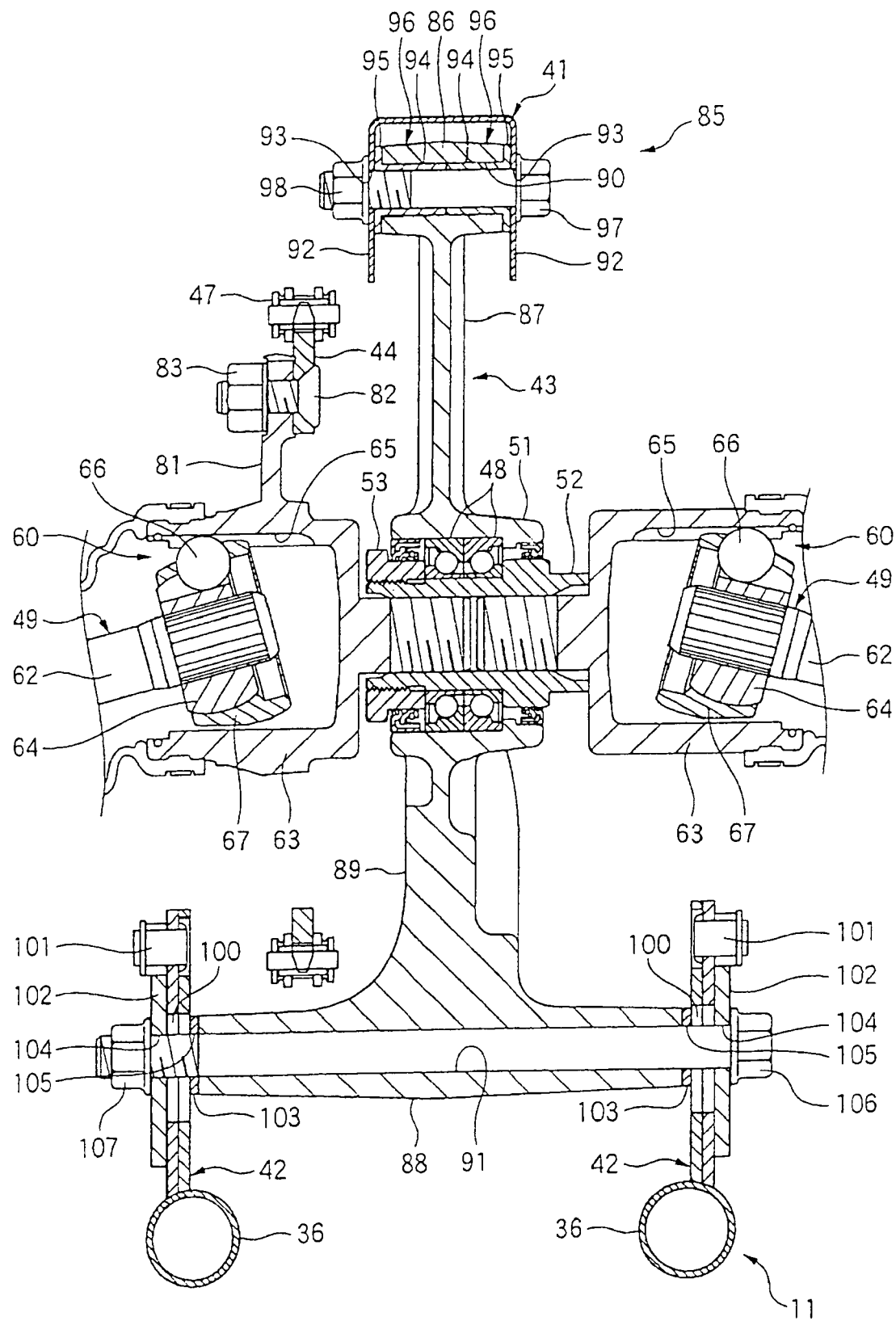
FIG. 3 is a cross sectional view of a periphery of the drive chain adjustment mechanism according to the embodiment of the present invention.
Figure 4:
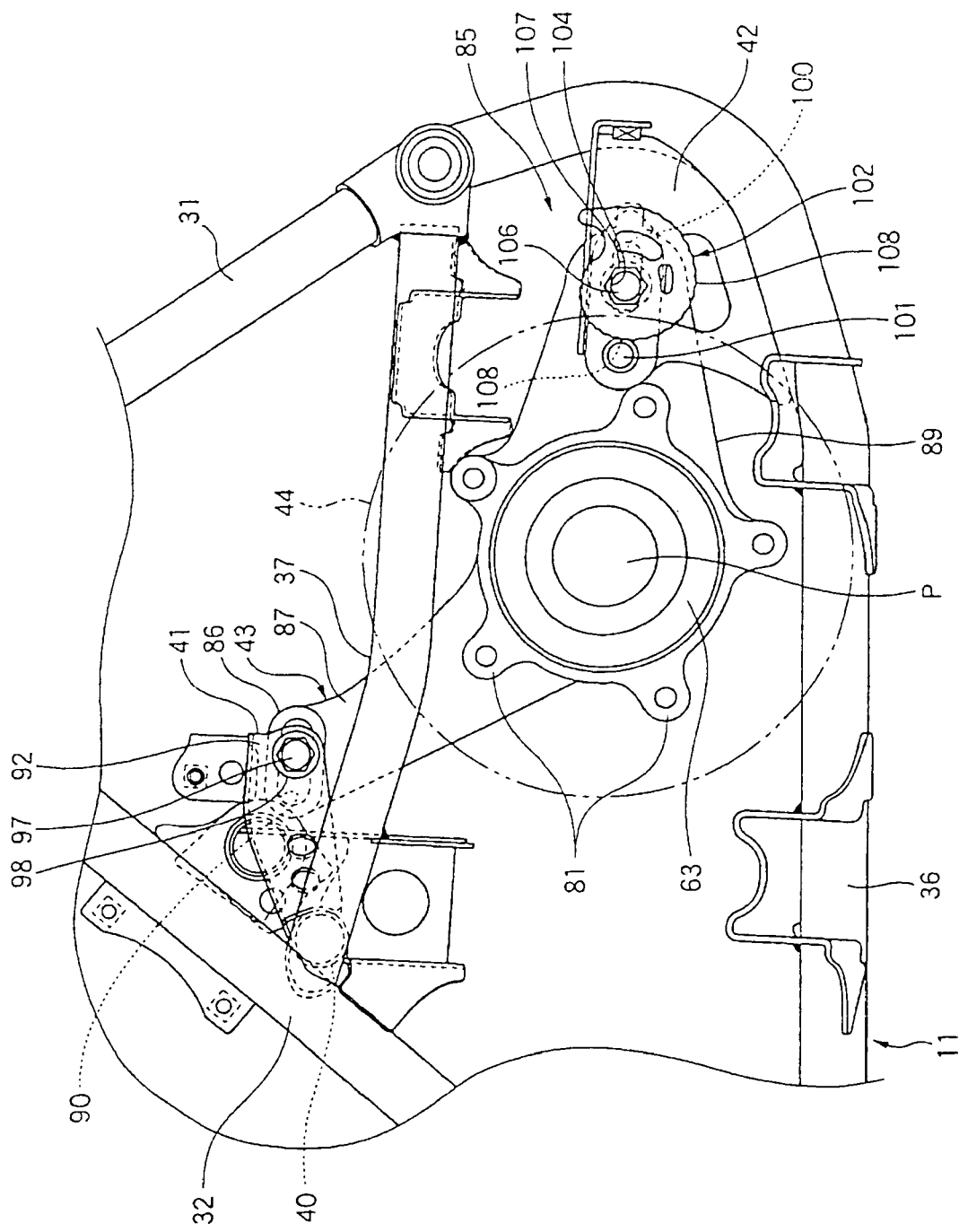
FIG. 4 is a side view of a periphery of the drive chain adjustment mechanism according to the embodiment of the present invention.

Next, a description will be made of a drive chain adjustment mechanism 85 of this embodiment, which adjusts tension of the drive chain 47 by moving the above-described driven sprocket 44 in a fore and aft direction of the vehicle body, with reference mainly to FIG. 3 and FIG. 4.

The case 43 includes the cylinder portion 51, which holds the above-described bearing 48; a front-side extended portion 87, which is extended upward toward the front from the cylinder portion 51, and which is supported on the front support bracket 41 by a front attachment portion 86 as a second support portion, provided on a tip end of the front-side extended portion 87 and extended right and left; and a rear-side extended portion 89, which is extended rearward from the cylinder portion 51, and which is supported on the right and the left rear support brackets 42 by a rear attachment portion 88 as a first support portion, provided on a tip end of the rear-side extended portion 89 and extended right and left. In the front attachment portion 86, a long hole 90, long in the fore and aft direction, is formed so as to penetrate therethrough in the right and left direction. In the rear attachment portion 88, a circular insertion hole 91 is formed so as to penetrate therethrough in the right and left direction.

The front support bracket 41 is fixed to the center of the cross pipe 40 in the right and left direction, which couples the right and the left rear middle frames 37 to each other. In a right and left pair of attachment plate portions 92 forming the front support bracket 41, circular insertion holes 93 individually penetrating therethrough in the right and left direction are formed coaxially with each other.

Meanwhile, in the long hole 90 formed in the front attachment portion 86, a right and left pair of collars 96, each of which has a cylinder portion 94 and a flange portion 95, are slidably housed in a form of inserting the cylinder portions 94 thereinto. Then, in a state where the front attachment portion 86, into which the pair of collars 96 are fitted, is inserted between the pair of attachment plate portions 92 of the front support bracket 41, a bolt 97 is inserted into the cylinder portions 94 of the pair of collars 96 in the long hole 90 and into the insertion holes 93 of the pair of attachment plate portions 92. Then, a nut 98 is screwed and tightened with the bolt 97 protruding from the insertion hole 93 of one of the attachment plate portions 92. Thus, the bolt 97 and the pair of collars 96 are fixed to the front support bracket 41, and the front attachment portion 86 of the case 43 is slidably supported in the fore and aft direction by the long hole 90 with respect to the pair of collars 96 fixed to the front support bracket 41.

Moreover, in the right and left pair of rear support brackets 42 fixed to the right and the left rear lower frames 36, long holes 100, individually long in the fore and aft direction, are formed so as to penetrate therethrough, while being aligned with each other in rear of the outer rings 63 which serve as shaft portions of the driven sprocket 44. Furthermore, on outsides of the rear support bracket 42 in the right and left direction in front of the long holes 100, rotatable pins 101 are attached in rear of the outer rings 63 while arranging axial lines thereof in the right and left direction. In particular, in this embodiment, the pins 101 and the long holes 100 are arranged substantially rearward of a rotation axis line P of the driven sprocket 44, and long-side portions of the long holes 100 are arranged parallel to a long-side portion of the long hole 90 formed in the front attachment portion 86.

Then, the rear attachment portion 88 of the case 43 is disposed between the pair of rear support brackets 42, and spacers 103 are individually arranged between the rear attachment portion 88 and the pair of rear support brackets 42. Moreover, on both outsides of the rear attachment portion 88 of the case 43 in the right and left direction of the vehicle body, that is, on both outsides of the pair of rear support brackets 42 in the right and left direction, a pair of cams 102 are arranged so as to abut on rear portions of the pins 101. Note that the pair of cams 102 are arranged at positions to interpose the drive chain 47 therebetween in the right and left direction of the vehicle body.

In this state, a bolt 106 is inserted through circular insertion holes 104 of the pair of cams 102, the long holes 100 of the pair of rear support brackets 42, circular insertion holes 105 of the pair of spacers 103, and a circular insertion hole 91 of the rear attachment portion 88 of the case 43. Then, the nut 107 is screwed and tightened with the bolt 106 protruding from the insertion hole 104 of one of the cams 102. Hence, by using the bolt 106 and the nut 107, which are located rearward of the outer rings 63 as the shaft portion of the driven sprocket 44, the pair of cams 102, the pair of spacers 103, and the case 43 including the rear attachment portion 88 are attached to the rear support brackets 42, that is, to the vehicle body frame 11.

Meanwhile, when the bolt 106 and nut 107 are loosened, the cams 102, the spaces 103, the case 43 including the rear attachment portion 88, the bolt 106, and the nut 107 entirely become slidable fore and aft by the long holes 100 of the rear support brackets 42 while maintaining individual positions thereof with respect to a center of the bolt 106.

Here, on outer circumferential surfaces of the cams 102, a large number of recessed portions 108 capable of being engaged with the pins 101 by abutting on the pins 101 are arrayed in a circumferential direction. Each of the recessed portions 108 have a shape recessed into a circular arc in a direction of the insertion holes 104 as a rotation center of the cams 102. In addition, the recessed portions 108 are arranged at positions where distances thereof from a center of the insertion holes 104 are sequentially increased toward one side in the circumferential direction. Thus, when the right and the left cams 102 are appropriately rotated, for example, in a direction of increasing the distances of the recessed portions 108 from the rotation center, positions of the recessed portions 108, where the right and the left cams 102 are engaged with the pins 101, are changed. As a result, a distance between the bolt 106 and the right and the left pins 101 will be changed in such a manner that the pins 101 are pushed by the cams 102.

Specifically, a fore and aft position of the rear attachment portion 88 of the case 43, which supports the bolt 106, will be changed with respect to the vehicle body frame 11 to which the right and the left pins 101 are attached. In this case, the front attachment portion 86 of the case 43, which is another attachment portion to the vehicle body frame 11, slides fore and aft by the long hole 90 thereof with respect to the collars 96 fixed to the vehicle body frame 11 in synchronization with the above-described change of position. Hence, the case 43 moves fore and aft without changing an attitude thereof. In this way, a fore and aft position of the driven sprocket 44 attached to the case 43 can be adjusted, and the tension of the drive chain 47 can be adjusted.

Then, after the tension of the drive chain 47 is adjusted by appropriately changing the recessed portions 108 of the cams 102, which are engaged with the pins 101, in such a manner as described above, the bolt 106 and the nut 107 are tightened together while keeping the pins 101 and the recessed portions 108 of the cams 102 in contact with each other. Then, the right and the left cams 102, the right and the left spacers 103, and the case 43 including the rear attachment portion 88 are fixed again to the vehicle frame 11. The position of the driven sprocket 44 supported on the case 43 with the outer ring 63 is fixed with respect to the vehicle body frame 11. Note that the drive chain 47 is basically stretched as a running distance of the all terrain vehicle 10 is being increased. Accordingly, the rotation direction of the cams 102 usually becomes the direction of moving the driven sprocket 44 rearward. However, in the case of replacing the drive chain 47 by a new one, and so on, the cams 102 are angularly rotated at a time in a direction reverse to the above, and the recessed portions 108 in which the distances from the rotation center are smaller are made to abut on the pins 101.

As described above, in accordance with the drive chain adjustment mechanism 85 according to this embodiment, the case 43, to which the driven sprocket 44 is coupled, and the cams 102, which move the case 43 with respect to the vehicle body frame 11 in the fore and aft direction, are fastened together to the vehicle body frame 11 by the bolt 106 and the nut 107, which are located rearward of the shaft portion of the driven sprocket 44. Accordingly, when the screwed bolt 106 and nut 107 are loosened, the case 43 becomes movable fore and aft with respect to the vehicle body frame 11, and it becomes possible to adjust the position of the case 43 by the rotation of the cams 102. Then, the position of the case 43 is adjusted by the cams 102, the tension of the drive chain 47 is thus adjusted, and thereafter, the bolt 106 and the nut 107 are tightened. Thus, the case 43 is attached to the vehicle body frame 11 together with the cams 102. Hence, it becomes unnecessary to loosen and tighten other bolts which support the case 43 on the vehicle body side, and thereby the tension adjustment work of a drive chain 47 is made easier.

Moreover, the case 43 includes at least the rear attachment portion 88 and the front attachment portion 86, which are supported on the vehicle body frame 11. The rear attachment portion 88 is coupled to the vehicle body frame 11 together with the cams 102 with the bolt 106 and the nut 107, which are movable in the fore and aft direction with respect to the long holes 100 of the rear support brackets 42 of the vehicle body frame 11. Furthermore, the front attachment portion 86 has the long hole 90, which allows the case 43 to move in the fore and aft direction with respect to the vehicle body frame 11. Accordingly, the bolt 106 and the nut 107 are moved in the fore and aft direction in response to the rotation of the cams 102 in the rear attachment portion 88, and the case 43 thus moves in the fore and aft direction in the front attachment portion 86 and the rear attachment portion 88. Hence, also in the case where the case 43 is supported on the vehicle body frame 11 at least by the front attachment portion 86 and the rear attachment portion 88, it is possible to adjust the drive chain only by work for the rear attachment portion 88, and thereby the tension adjustment work of a drive chain 47 is made easier and the number of parts can be reduced.

Furthermore, the pair of cams 102 are provided on both sides of the vehicle body in the right and left direction, and the drive chain 47 is disposed between the pair of cams 102 in the right and left direction of the vehicle body. Accordingly, the tension of the drive chain 47 can be received by the right and left pair of cams 102 with good balance, and other members which support the tension of the drive chain 47 become unnecessary.

Moreover, the rear wheels 18 are suspended right and left independently of each other with the pair of drive shafts 49 individually held by the pair of outer rings 63, the driven sprocket 44 is fixed to one of the outer rings 63, and the pair of outer rings 63 are rotatably supported by the bearing 48 held on the case 43. Accordingly, the drive chain adjustment mechanism 85 can be applied to a chain-driven vehicle with a rear-wheel independent suspension system.

Note that the present invention is not limited to the above-described embodiment, and appropriate modifications, improvements, and the like are possible.

In this embodiment, the description has been made by taking, as an example, the all terrain vehicle 10 which suspends the right and the left rear wheels 18 independently of each other. However, the present invention is also applicable to the one which supports the right and the left rear wheels 18 directly coupled to each other with an axle shaft. Moreover, the vehicle of the present invention just needs to be the one which chain-drives the two rear wheels, and the present invention is also applicable to a three-wheeled chain-driven vehicle without being limited to the four-wheeled vehicle.

Moreover, in this embodiment, the pair of outer rings 63 are screwed with the sleeve 52, and the pair of outer rings 63 are thus coupled to the case 43 with the bearing 48. However, the present invention is also applicable to a case in which the pair of outer rings 63 are coupled to the case 43 by directly fitting the inner ring of the bearing 48 to the outer circumferential surfaces of the pair of outer rings 63, and the driven sprocket 44 is disposed in the case 43.

Furthermore, in this embodiment, the case 43 is attached to the vehicle body frame 11 by the two support portions which are the front attachment portion 86 and the rear attachment portion 88. However, another support portion having a long hole, such as one in the front attachment portion 86, which allows the case 43 to move in the fore and aft direction with respect to the vehicle body frame 11 may be further provided, and the case 43 may be thus attached to the vehicle body frame 11.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A drive chain adjustment mechanism of a chain-driven vehicle chain-driving two rear wheels, the chain-driven vehicle being adapted to drive the rear wheels with a drive chain and a driven sprocket around which the drive chain is wound, and to move the driven sprocket in a fore and aft direction of a vehicle body, thereby adjusting tension of the drive chain, wherein the rear wheels are suspended right and left independently of each other with a pair of axle shafts individually held by a pair of outer rings, the driven sprocket is fixed to one of the outer rings, the pair of outer rings is rotatably supported by a cylinder portion of a case with a bearing, the case includes the cylinder portion, a first support portion and a second support portion, the first support portion being extended rearward from the cylinder portion and supported on the vehicle body by a tip end thereof extended in a right and left direction of the vehicle body, the second support portion being extended forward from the cylinder portion and supported on the vehicle body by a tip end thereof, the first support portion is attached to a support bracket of the vehicle body together with a cam with a bolt, and is thus coupled to the vehicle body with the bolt at a position rearward of a shaft portion of the driven sprocket, the support bracket including a long hole long in the fore and aft direction and a pin provided in front of the long hole, the cam moving the case in the fore and aft direction with respect to the vehicle body while changing a position where the cam abuts on the pin on an outer circumferential surface thereof, the bolt being inserted into the long hole and movable in the fore and aft direction with respect to the vehicle body, the second support portion has a long hole which allows the case to move in the fore and aft direction with respect to the vehicle body, the cam includes a pair of the cams provided on both sides of the first support portion in the right and left direction of the vehicle body, and the drive chain is disposed between the pair of cams in the right and left direction of the vehicle body.

2. The drive chain adjustment mechanism of a chain-driven vehicle according to claim 1, wherein the second support portion is a front attachment portion.

3. The drive chain adjustment mechanism of a chain-driven vehicle according to claim 1, wherein the drive chain is adjustable by moving the first support portion with respect to left and right lower frames of the vehicle body.

4. The drive chain adjustment mechanism of a chain-driven vehicle according to claim 1, wherein a vehicle body frame includes: a right and left pair of lower frames having lower-portion-side portions extended substantially horizontally toward the rear and slant portions extended upward toward the rear from the lower-portion-side portions, rear end portions of the slant portions being coupled to seat rails, respectively; a right and left pair of rear lower frames extended substantially horizontally toward the rear from rear portions of the lower-portion-side portions of the lower frames, then extended upward, and coupled to rear end portions of the seat rails, respectively; a right and left pair of rear middle frames coupling the slant portions of the lower frames and the rear end portions of the seat rails to each other, respectively; and a cross pipe extended in the right and left direction of the vehicle body and coupling front portions of the right and left pair of rear middle frames to each other, and the second support portion of the case is fixed to a center of the cross pipe in the right and left direction of the vehicle body.

5. The drive chain adjustment mechanism of a chain-driven vehicle according to claim 4, wherein the first support portion of the case is laid between the support brackets fixed to the right and left pair of rear lower frames, and fixed to the support brackets with the bolts.

6. A drive chain adjustment mechanism of a chain-driven vehicle chain-driving two rear wheels, the chain-driven vehicle being adapted to drive the rear wheels with a drive chain and a driven sprocket around which the drive chain is wound, and to move the driven sprocket in a fore and aft direction of a vehicle body, thereby adjusting tension of the drive chain, wherein the rear wheels are suspended right and left independently of each other with a pair of axle shafts individually held by a pair of outer rings, the driven sprocket is fixed to one of the outer rings, the pair of outer rings is rotatably supported by a cylinder portion of a case with a bearing, the case includes the cylinder portion, a first support portion and a second support portion, the first support portion being extended rearward from the cylinder portion and supported on the vehicle body by a tip end thereof extended in a right and left direction of the vehicle body, the second support portion being extended forward from the cylinder portion and supported on the vehicle body by a tip end thereof, the first support portion is attached to a support bracket of the vehicle body together with a cam with a bolt, and is thus coupled to the vehicle body with the bolt at a position rearward of a shaft portion of the driven sprocket, the support bracket including a long hole long in the fore and aft direction and a pin provided in front of the long hole, the cam moving the case in the fore and aft direction with respect to the vehicle body while changing a position where the cam abuts on the pin on an outer circumferential surface thereof, the bolt being inserted into the long hole and movable in the fore and aft direction with respect to the vehicle body, the second support portion has a long hole which allows the case to move in the fore and aft direction with respect to the vehicle body, the cam includes a pair of the cams provided on both sides of the first support portion in the right and left direction of the vehicle body, the drive chain is disposed between the pair of cams in the right and left direction of the vehicle body, the driven sprocket is coupled to the case, the bolt attaches the cam and the case to a fixed portion of the vehicle body, the driven sprocket is fixed to the one of the outer rings in a position between the cam and a side wall of the case, and the case is non-movable relative to a center of the bolt when the bolt slides in the fore and aft direction of the vehicle body.

7. The drive chain adjustment mechanism of a chain-driven vehicle according to claim 6, wherein a vehicle body frame includes: a right and left pair of lower frames having lower-portion-side portions extended substantially horizontally toward the rear and slant portions extended upward toward the rear from the lower-portion-side portions, rear end portions of the slant portions being coupled to seat rails, respectively; a right and left pair of rear lower frames extended substantially horizontally toward the rear from rear portions of the lower-portion-side portions of the lower frames, then extended upward, and coupled to rear end portions of the seat rails, respectively; a right and left pair of rear middle frames coupling the slant portions of the lower frames and the rear end portions of the seat rails to each other, respectively; and a cross pipe extended in the right and left direction of the vehicle body and coupling front portions of the right and left pair of rear middle frames to each other, and the second support portion of the case is fixed to a center of the cross pipe in the right and left direction of the vehicle body.

8. The drive chain adjustment mechanism of a chain-driven vehicle according to claim 7, wherein the first support portion of the case is laid between the support brackets fixed to the right and left pair of rear lower frames, and fixed to the support brackets with the bolts.

9. A drive chain adjustment mechanism of a chain-driven vehicle chain-driving two rear wheels, the chain-driven vehicle being adapted to drive the rear wheels with a drive chain and a driven sprocket around which the drive chain is wound, and to move the driven sprocket in a fore and aft direction of a vehicle body, thereby adjusting tension of the drive chain, wherein the rear wheels are suspended right and left independently of each other with a pair of axle shafts individually held by a pair of outer rings, the driven sprocket is fixed to one of the outer rings, the pair of outer rings is rotatably supported by a cylinder portion of a case with a bearing, the case includes the cylinder portion, a first support portion and a second support portion, the first support portion being extended rearward from the cylinder portion and supported on the vehicle body by a tip end thereof extended in a right and left direction of the vehicle body, the second support portion being extended forward from the cylinder portion and supported on the vehicle body by a tip end thereof, the first support portion is attached to a support bracket of the vehicle body together with a cam with a bolt, and is thus coupled to the vehicle body with the bolt at a position rearward of a shaft portion of the driven sprocket, the support bracket including a long hole long in the fore and aft direction and a pin provided in front of the long hole, the cam moving the case in the fore and aft direction with respect to the vehicle body while changing a position where the cam abuts on the pin on an outer circumferential surface thereof, the bolt being inserted into the long hole and movable in the fore and aft direction with respect to the vehicle body, the second support portion has a long hole which allows the case to move in the fore and aft direction with respect to the vehicle body, the cam includes a pair of the cams provided on both sides of the first support portion in the right and left direction of the vehicle body, the drive chain is disposed between the pair of cams in the right and left direction of the vehicle body, the driven sprocket is coupled to the case, the bolt attaches the cam and the first support portion of the case to each of left and right fixed lower frames of the vehicle body, and a second bolt connects the second support portion of the case to the vehicle body, wherein the case is non-movable relative to a center of the bolt when the bolt slides in the fore and aft direction of the vehicle body.

10. The drive chain adjustment mechanism of a chain-driven vehicle according to claim 9, wherein the outer rings serve as the shaft portion of the driven sprocket.

11. The drive chain adjustment mechanism of a chain-driven vehicle according to claim 9, wherein the outer circumferential surface of the cam includes multiple recessed portions arrayed in a circumferential direction of the cam, the recessed portions being capable of being engaged with the pin by abutting on the pin, wherein the recessed portions are arranged at positions where distances thereof from a center of the long hole are sequentially increased toward one side in the circumferential direction.

12. The drive chain adjustment mechanism of a chain-driven vehicle according to claim 9, wherein the second support portion is a front attachment portion.

13. The drive chain adjustment mechanism of a chain-driven vehicle according to claim 9, wherein the drive chain is adjustable by moving the first support portion with respect to the left and right fixed lower frames of the vehicle body.

14. The drive chain adjustment mechanism of a chain-driven vehicle according to claim 9, wherein a vehicle body frame includes: the right and left pair of lower frames having lower-portion-side portions extended substantially horizontally toward the rear and slant portions extended upward toward the rear from the lower-portion-side portions, rear end portions of the slant portions being coupled to seat rails, respectively; a right and left pair of rear lower frames extended substantially horizontally toward the rear from rear portions of the lower-portion-side portions of the lower frames, then extended upward, and coupled to rear end portions of the seat rails, respectively; a right and left pair of rear middle frames coupling the slant portions of the lower frames and the rear end portions of the seat rails to each other, respectively; and a cross pipe extended in the right and left direction of the vehicle body and coupling front portions of the right and left pair of rear middle frames to each other, and the second support portion of the case is fixed to a center of the cross pipe in the right and left direction of the vehicle body.

15. The drive chain adjustment mechanism of a chain-driven vehicle according to claim 14, wherein the first support portion of the case is laid between the support brackets fixed to the right and left pair of rear lower frames, and fixed to the support brackets with the bolts.

* * * * *